Jan. 3, 1956
A. A. BERNDT
2,729,480
ROPE THIMBLE
Filed May 12, 1953
4 Sheets-Sheet 1
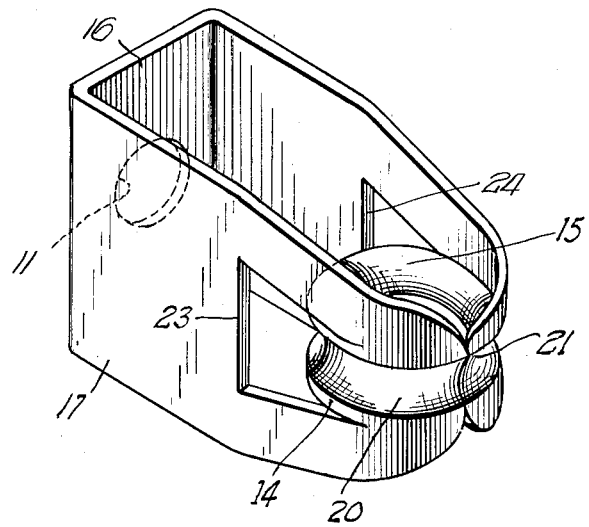
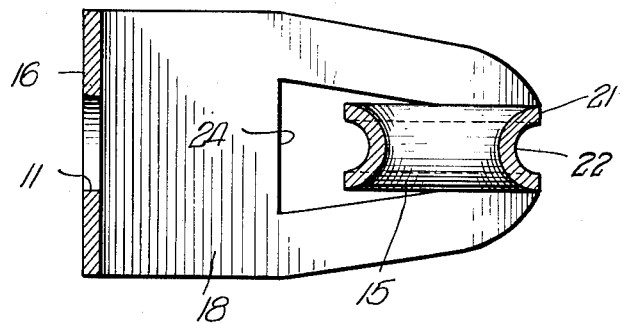
INVENTOR.
Arthur A. Berndt,
BY
Wilkinson Hadley Byron & Hume
attys

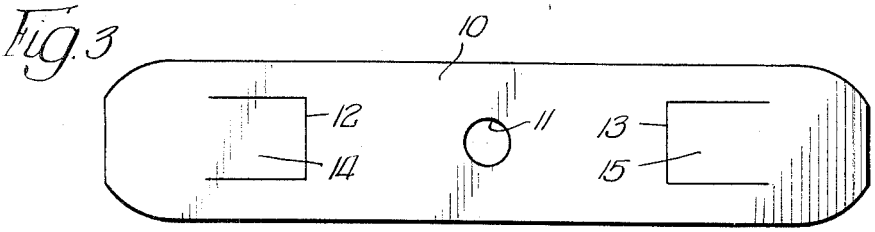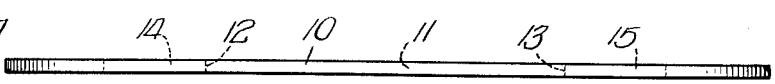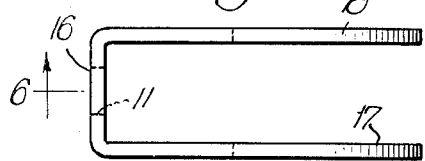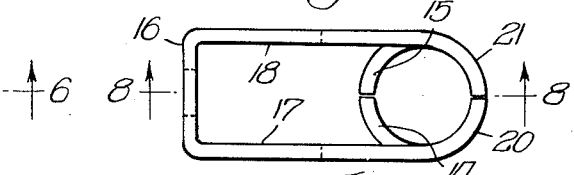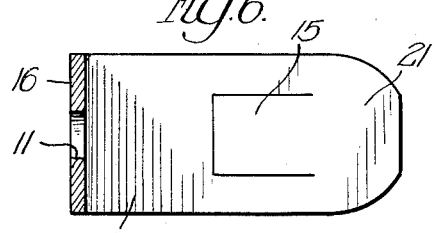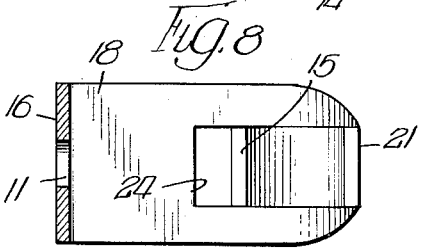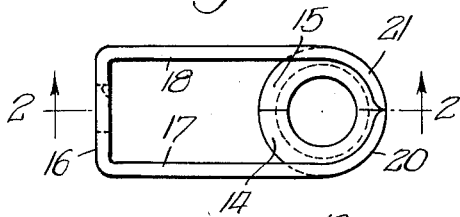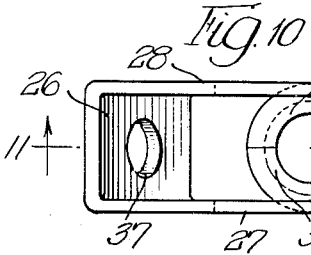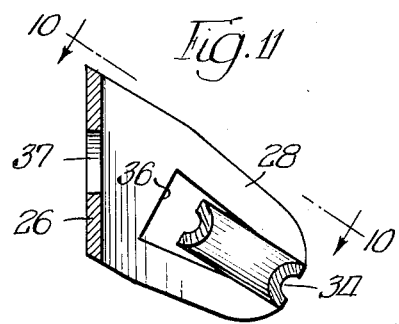

Jan. 3, 1956 A. A. BERNDT 2,729,480
ROPE THIMBLE
Filed May 12, 1953 4 Sheets-Sheet 3
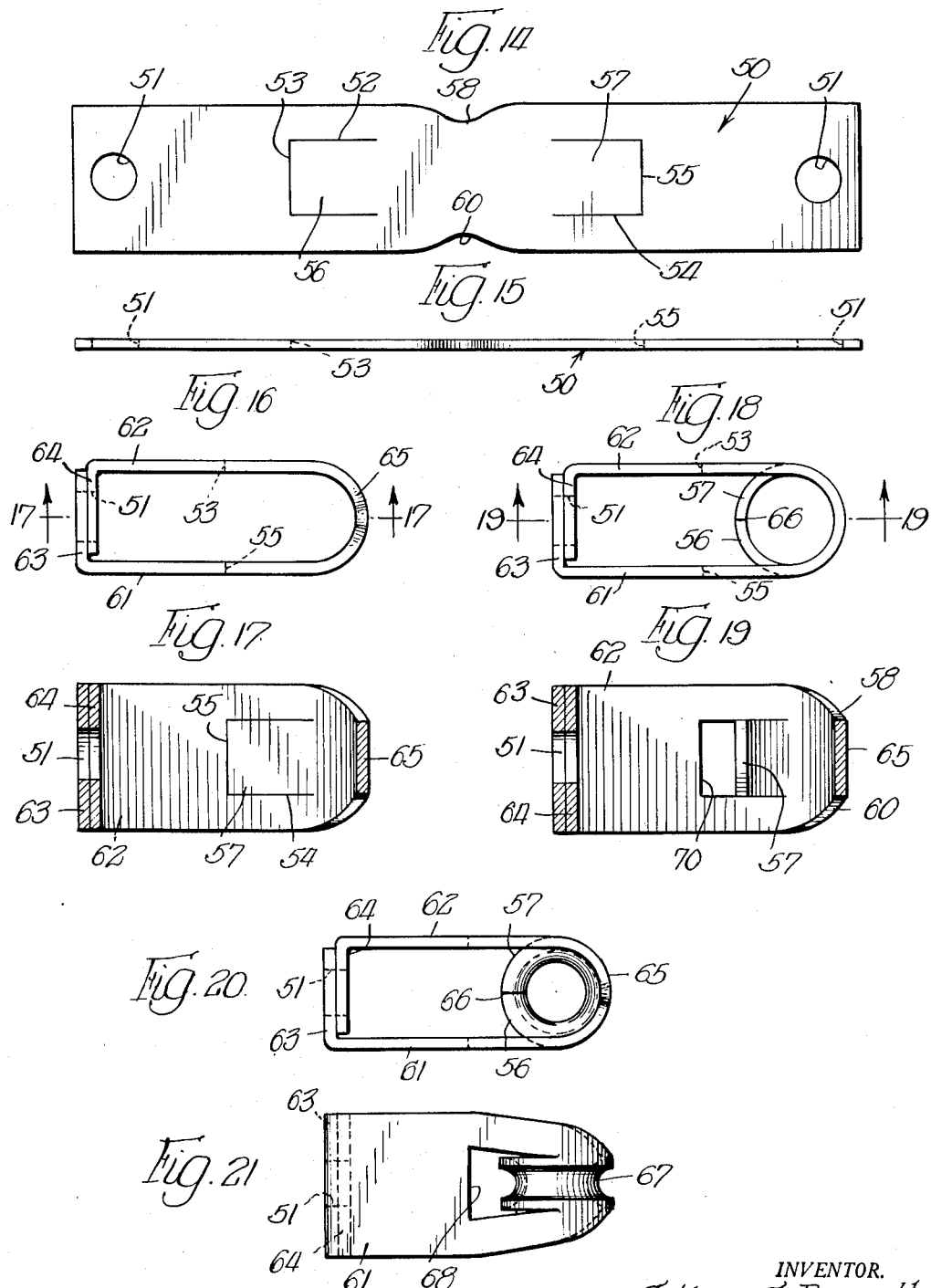
INVENTOR.
Arthur A. Berndt, Jan. 3, 1956  A. A. BERNDT  2,729,480
ROPE THIMBLE Filed May 12, 1953  4 Sheets-Sheet 4

INVENTOR.
Arthur A. Berndt,
BY

United States Patent Office 2,729,480
Patented Jan. 3, 1956

2,729,480

ROPE THIMBLE

Arthur A. Berndt, Chicago, Ill., assignor to Electroline Company, Chicago, Ill., a corporation of Illinois Application May 12, 1953, Serial No. 354,520

6 Claims. (Cl. 287—81)

The invention relates to anchoring means for guy wires and stay wires and has reference in particular to an improved rope or guy thimble for anchoring one end of such wires to a support.

In connection with electric power lines, it is necessary to install a great many guys or stays for the proper support and tensioning of the power lines. Said wires generally consist of stranded steel cable which is fastened to poles, cross arms, buildings, and in some cases to trees. The structure heretofore used for fastening the guy cable to its anchorage consisted of an assembled clevis including a pin and thimble and which was bolted to the anchorage. The guy wire was looped through the thimble and secured by a clamp. Said devices were satisfactory in operation although they had the disadvantage of including a large number of parts which necessitated an assembling operation on the job.

An object of the present invention is to simplify the guy thimbles as heretofore employed by eliminating some of the parts and by combining certain other parts into a unique device of one-piece construction whereby manufacturing costs are reduced and expenses incident to handling a number of individual parts are eliminated. Also as a result of the present unitary device the assembling and installation procedures are greatly simplified.

A further object of the present invention is to provide a guy thimble that can be produced from a sheet of material by conventional stamping, bending and welding operations.

A further object is to provide a guy thimble of one-piece construction which will be strong and sturdy in use, and which will efficiently fulfill all the requirements of an anchorage member for a guy or stay wire.

Another object resides in the provision of a one-piece guy thimble that can be produced from a single piece of metal by stamping, bending and welding operations that take place in sequence. The stamping of the sheet metal produces ears integral therewith and the bending of the stamped piece forms a clevis having parallel side members. The bending is continued on the ears and on the end portions of the side members which in combination provide the thimble element. The half sections of the thimble element provided by the respective side members are finally welded to complete the device.

With these and various other objects in view the invention may consist of certain novel features of construction and operation as will be more fully described and particularly pointed out in the specification, drawings and claims appended hereto.

In the drawings, which illustrate an embodiment of the invention, and wherein like reference characters are used to designate like parts—

Figure 1 is a perspective view illustrating the one-piece guy thimble comprising the present invention;

Figure 2 is a vertical sectional view taken on a longitudinal center line of the guy thimble shown in Figure 10 and which clearly illustrates the manner of forming the thimble of the device;

Figure 3 is a top plan view of a metal sheet following the stamping operation for stamping an opening and ears in the sheet;

Figure 4 is a side elevational view of the stamped metal sheet of Figure 3;

Figure 5 illustrates the first bending operation on the sheet to form a clevis;

Figure 6 is a vertical sectional view taken substantially along line 6—6 of Figure 5;

Figure 7 is a top plan view illustrating the next bending operation to form the thimble;

Figure 8 is a vertical sectional view taken substantially along line 8—8 of Figure 7;

Figure 9 is a top plan view of the completed guy thimble;

Figure 10 is a top plan view illustrating a modified form of guy thimble;

Figure 11 is a vertical sectional view taken substantially along line 11—11 of Figure 10;

Figure 14 is a top plan view of a metal sheet which has been stamped to form the base opening and ears for the thimble;

Figure 15 is a side elevational view of the stamped metal sheet of Figure 14;

Figure 16 illustrates the first bending operations on the metal sheet to form the clevis;

Figure 17 is a vertical sectional view taken substantially along line 17—17 of Figure 16;

Figure 18 is a top plan view illustrating the next bending operation wherein the ears are arcuately bent rearwardly;

Figure 19 is a vertical sectional view taken substantially along line 19—19 of Figure 18;

Figure 20 is a top plan view of the completed guy thimble; and

Figure 21 is a side elevational view.

Figure 12:
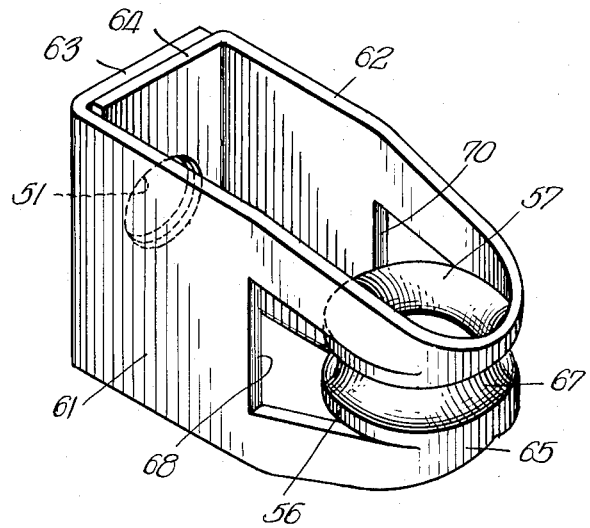
Figure 12 is a perspective view illustrating another modified form of one-piece guy thimble coming within the invention.

The guy thimble of the invention is formed from a single strip of metal such as 10, Figure 3, which may be composed of wrought iron, steel, aluminum or other suitable material of the proper thickness. The length and width of the strip is predetermined according to the size of the guy thimble to be produced. The first operation on the blank is the cutting or stamping operation which produces opening 11 in the center of the blank and the cuts 12 and 13 on spaced horizontal and vertical lines which respectively form the ear portions 14 and 15. The ear portions 14 and 15 are located adjacent respective ends of the blank and each portion is substantially rectangular in form with its longitudinal axis coinciding with that of the blank. The first bending operation on the blank produces the clevis or yoke, as shown in Figure 5, and which includes base 16 and the forwardly extending side walls 17 and 18. Each side wall contains an ear portion which is disposed rearwardly toward the base, as best shown in Figure 6.

The next operation consists in bending the clevis to form a ring integral therewith and which is located at the forward end of the clevis. The end portions 20 and 21 on the side walls respectively are arcuately bent in a forwardly, inwardly direction until the end portions contact each other, forming a semi-circular front end for the clevis. It is contemplated that the end portions will be welded along their contacting edges in order to add to the strength and rigidity of the present device.

In a somewhat similar manner the ear portions 14 and 15 are arcuately bent inwardly but in a direction rearwardly of the clevis and to an extent where the ear portions will contact each other. Welding is also resorted to here for joining the ear portions which, in combination with the semi-circular front of the clevis, unite to form a metal ring and which ring constitutes the thimble of the device.

In order that the thimble may conform to the contour of the guy wires or stay wires, which are looped around the thimble, the metal ring is shaped in a transverse direction to form a semi-circle. The semi-circular shape of the thimble, which provides the recess 22, as best disclosed in Figure 2, is just slightly larger in diameter than that of the guy wires to be associated therewith. It will be understood that the forming operation on the thimble to produce the semi-circular shape in transverse section contracts the side walls in the vicinity of the thimble and as a result openings 23 and 24 are approximately triangular in shape in the completed device, although said openings were square when the ear portions were initially bent from the blank. Also it will be noted that the axis of the thimble is vertical when the clevis is supported as shown in Figure 1, or, in other words, the axis of the thimble is parallel with the plane of base 16.

The opening 11 in the base or rear wall of the clevis is employed for bolting or otherwise securing the device to its anchorage. With the device supported as shown in Figure 1, the thimble is located at the forward end of the clevis and is disposed so that its axis is substantially vertical. It is therefore easy to loop the guy wire through openings 23 and 24 and into the semi-circular recess 22 provided by the thimble. The looped end of the guy wire is then fastened in a conventional manner after the desired tension is placed on the wire by taking up the excess slack. Since the present device consists of only one piece, assembling operations on the job are entirely eliminated and the installation procedure is materially simplified. Also the present one-piece guy thimble can be economically manufactured since relatively simple stamping, bending and welding operations are all that is required.

Figures 10 and 11 illustrate a modified form of guy thimble embodying the improved features of the invention but which differ from the device shown in Figures 1 and 2 in that the forwardly extending side walls of the clevis are disposed in a downward direction with respect to the base. The device is formed from a metal blank which is cut to a predetermined shape in order that the clevis, when the same is bent from the blank, will consist of a vertically disposed base or rear wall 26 and forwardly extending spaced side walls 27 and 28, which, however, are directed downwardly at an angle of approximately forty-five degrees with respect to the base 26. Ear portions 30 and 31 are cut from the blank and the same are arcuately bent inwardly and rearwardly as regards the clevis until they contact each other, whereupon they are welded as explained in connection with the device of Figures 1 and 2. Also the terminal end portions 32 and 33 of the side walls 27 and 28 are arcuately bent inwardly into contact with each other and their contacting edge is welded to thus unite the side walls of the clevis and to form the metal ring providing the thimble of the device. The next operation consists in bending the metal ring into semi-circular shape in a direction transversely of the ring, which results in the recess 34 whereby the thimble accommodates the guy wire associated therewith to the best advantage. Openings 35 and 36 in the side walls, respectively, are produced by the ear portions and the guy wire is passed through these openings in assembling the wire on the thimble. Also the center opening 37 in the base 26 is employed in a manner as heretofore explained for bolting or otherwise securing the clevis to its anchorage.

The sequence of operations in forming the present rope thimble may be varied to best suit manufacturing requirements instead of bending the strip of sheet metal into clevis form and then shaping the ear portions 14 and 15 as illustrated in Figures 5 and 7, respectively, it is entirely feasible and from a manufacturing standpoint it is preferred to first bend and form the ear portions and to then bend the strip as thus shaped into its final clevis form. Although the sequence of operations may be varied, the final result is the same, namely, the production of a practical one-piece rope thimble for anchoring wires and cables such as guy wires and stay wires.

Figure 13:
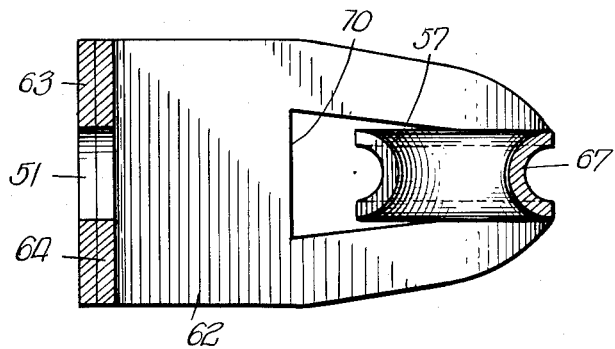
Figure 13 is a vertical sectional view taken substantially on the longitudinal center line of the guy thimble shown in Figure 12.

Referring to the modification shown in Figures 12 to 21 inclusive, the guy thimble is formed from a strip of metal 50, which may be wrought iron, steel, aluminum, or other suitable material of the proper thickness, and of the proper length and width to produce a guy thimble of the size desired. The first operation on the blank is a stamping and cutting operation, the result of which is to produce in the blank the openings 51 at respective ends, and the cuts 52, 53 and 54, 55. It will be observed that the cuts 52 and 54 are disposed parallel to the longitudinal axis of the blank, whereas cuts 53 and 55 are vertical, each pair providing ear portions identified by numerals 56 and 57. Said ear portions are located adjacent the center of the blank, which, in this modification, is reduced in width on its center line by reason of the top and bottom indentations 58 and 60. In other words, the formation of the openings and ear portions in this modification is substantially the reverse of that described and disclosed with respect to Figures 1 to 9 inclusive. In the first place, the openings 51 are located at the respective ends of the blank instead of in the center, the ear portions 56 and 57 are directed outwardly instead of inwardly, and the blank on its center line is reduced in width as described. The structural changes provide a rope thimble wherein the nose portion and thimble are integral with the blank and wherein the base of the clevis or yoke is formed by the respective ends of the blank which are bent so as to have overlapping relation.

To produce the clevis the first bending operation on the blank is applied to the respective end portions thereof containing the openings 51 which are bent into right angled relation with the remainder of the blank, and along with this bending operation the blank is bent on its center line in a manner to form a pair of spaced side portions 61 and 62, Figure 16. The bending of the end portions produces overlapping base sections 63 and 64, the same having overlapping relation so as to align openings 51. Also it will be observed that the blank is so bent with respect to its center line that an arcuate shaped nose portion 65 is formed.

The next operation consist in bending the ear portions 56 and 57 in a direction rearwardly of the clevis and to an extent where the ear portions will contact each other. The positions assumed by the ear portions following such a bending operation is shown in Figure 18. Welding is resorted to for joining the ear portions as at 66. The arcuate formation given to the bent ear portions is such as to form a ring in combination with nose portion 65 of the thimble.

The next operation on the thimble consists in shaping the metal ring in a transverse direction whereby to form a semi-circular recess in the ring for receiving guy wires or stay wires to be anchored by the device. The semi-circular shape of the thimble, which provides recess 67, Figure 21 should be slightly larger in diameter than that of the guy wires to be associated therewith and also, it will be understood that the forming operation on the thimble to produce the semi-circular shape in transverse section results in contracting the side walls in the vicinity of the thimble so that the openings 68 and 70 in the side portions of the clevis are approximately triangular in shape, whereas said openings were square when the ear portions were initially bent from the blank.

This application is a continuation-in-part of my copending application Serial No. 278,440, filed March 25, 1952, now abandoned, and entitled Rope Thimble.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a guy thimble, a device formed of sheet metal and including a clevis having a pair of spaced, forwardly extending side walls, an ear portion cut from each side wall and extending rearwardly of each side wall, each ear portion being arcuately bent inwardly of the clevis into contact with its opposite ear portion, the end portions of the side walls each being arcuately bent inwardly so as to contact each other, whereby the forward end of the clevis is semi-circular and which forms a ring with the semi-circular ear portions, and said ring in transverse section being bent into a semi-circular shape to complete the thimble of the device.

2. In a guy thimble of one-piece construction, a device formed of sheet metal and essentially consisting of a U-shaped clevis having a base and a pair of spaced, forwardly extending side walls, an ear portion integral with each side wall having been cut therefrom on a longitudinal axis parallel to that of its side wall, said ears each extending rearwardly toward the base and each ear portion being arcuately bent inwardly and rearwardly of the clevis into contact with its opposite ear portion, the end portions of the side walls each being arcuately bent forwardly and inwardly so as to contact each other, whereby the forward end of the clevis is semi-circular and which forms a ring with the semi-circular ear portions, and said ring in transverse section being bent into semi-circular shape to complete the thimble of the device.

3. In a guy thimble, a device formed of sheet metal and comprising a clevis providing a pair of spaced side walls, a base section and an arcuate nose portion, an ear portion cut from each side wall and extending rearwardly toward the base section and each ear portion being arcuately bent inwardly of the clevis into contact with its opposite ear portion, whereby said ear portions in combination with the nose portion form a ring which is integral with the clevis, and said ring in transverse section being bent into a semi-circular shape to complete the thimble of the device.

4. In a guy thimble of one-piece construction, a device formed from a sheet metal blank by stamping and bending operations and including a clevis providing a pair of spaced side walls, a base section and an arcuate nose portion, an ear portion integral with each side wall and extending rearwardly toward the base section and each ear portion being arcuately bent inwardly and rearwardly of the clevis so that said ear portions contact each other to form a ring with the arcuate nose portion, said ring having its axis disposed normal to the longitudinal axis of the side walls, and said ring in transverse section being bent into semi-circular shape to form a groove whereby to complete the thimble of the device.

5. In a guy thimble, a device formed from a sheet metal blank and comprising a clevis providing spaced side walls, an arcuate nose portion and a base section, said base section being formed by overlapping bent end portions of the sheet metal blank, an ear portion integral with each side wall and extending rearwardly toward the base section, each ear portion being arcuately bent inwardly and rearwardly of the clevis, whereby said ear portions contact each other to form a ring with the arcuate nose portion, said ring comprising the thimble of the device and having its axis disposed substantially normal to the longitudinal axis of the side walls, and said ring in transverse section being bent into semi-circular shape to form an exterior groove extending around the ring for receiving a guy wire adapted to be associated with the thimble.

6. In a guy thimble, in combination, a clevis consisting of a base and forwardly extending spaced side walls integral with the base, the outer end sections of the side walls being curved arcuately in a forward and inward direction to provide a nose portion for the clevis, said nose portion forming the front of the clevis and being substantially semi-circular in shape, an ear portion struck from the material of each side wall in the vicinity of said end sections and extending toward the base from the inwardly bent nose portion, each said ear portion being curved rearwardly and inwardly of the side walls into contact with each other, whereby said curved ear portions in combination with the nose portion of the clevis form a ring having its axis disposed substantially normal to the longitudinal axis of the side walls, said ring comprising the thimble of the clevis and being integral with said clevis, and said ring being formed into a semi-circular shape transversely of the ring to provide a recess extending around the ring for receiving a guy wire adapted to be associated with the thimble.

References Cited in the file of this patent

UNITED STATES PATENTS

| | | |
|---|---|---|
| 438,904 | Walton | Oct. 21, 1890 |
| 2,007,913 | Durr | July 9, 1935 |
| 2,252,566 | Hocher | Aug. 12, 1941 |